US012587850B2

(12) United States Patent
Marotzke et al.

(10) Patent No.: US 12,587,850 B2
(45) Date of Patent: Mar. 24, 2026

(54) SYSTEMS AND METHODS OF ENFORCING POLICY COMPLIANCE OF VEHICLES

(71) Applicant: NXP B.V., Eindhoven (NL)

(72) Inventors: Adrian Marotzke, Hamburg (DE);
Grishma Raj Pandeya, Hamburg (DE);
Loïc Fredric Fernau, Hamburg (DE);
Harsha Shivasharanappa Master,
Hamburg (DE)

(73) Assignee: NXP B.V., Eindhoven (NL)

( * ) Notice: Subject to any disclaimer, the term of this patent is extended or adjusted under 35 U.S.C. 154(b) by 333 days.

(21) Appl. No.: 18/356,679

(22) Filed: Jul. 21, 2023

(65) Prior Publication Data

US 2025/0031038 A1    Jan. 23, 2025

(51) Int. Cl.
| | |
|---|---|
| *H04W 12/00* | (2021.01) |
| *G07C 5/00* | (2006.01) |
| *H04W 12/069* | (2021.01) |
| *H04W 12/37* | (2021.01) |

(52) U.S. Cl.
CPC .......... *H04W 12/069* (2021.01); *G07C 5/008* (2013.01); *H04W 12/37* (2021.01)

(58) Field of Classification Search
CPC .... H04W 12/069; H04W 12/37; G07C 5/008;
G07C 455/411
See application file for complete search history.

(56) References Cited

U.S. PATENT DOCUMENTS

| | | | |
|---|---|---|---|
| 8,884,757 | B2 | 11/2014 | Sasson et al. |
| 9,444,849 | B2 | 9/2016 | Angus et al. |
| 9,514,308 | B2 | 12/2016 | Filippi et al. |
| 9,608,828 | B1 | 3/2017 | Denton et al. |
| 9,626,874 | B1 * | 4/2017 | Gupta ...................... G08G 5/22 |
| 9,874,874 | B2 | 1/2018 | Bernhardt et al. |
| 10,401,183 | B2 | 9/2019 | Biswas et al. |
| 10,676,216 | B2 | 6/2020 | Chan et al. |
| 11,157,648 | B1 | 10/2021 | Amico |
| 2008/0252450 | A1 | 10/2008 | Wandel |
| 2017/0337826 | A1 | 11/2017 | Moran et al. |

(Continued)

FOREIGN PATENT DOCUMENTS

| | | |
|---|---|---|
| CN | 109862696 B | 6/2019 |
| CN | 111465010 A | 7/2020 |

(Continued)

OTHER PUBLICATIONS

Shimada, H., "Implementation and Evaluation of Local Dynamic Map in Safety Driving Systems," Journal of Transportation Technologies, Apr. 2015, vol. 5, No. 2, pp. 102-112. Available online at: <http://www.scirp.org/journal/jtts><http://dx.doi.org/10.4236/jtts.2015.52010>; Apr. 2015.

*Primary Examiner* — Khai M Nguyen

(57)    ABSTRACT

A vehicle includes a compliance security module (CSM) configured to ensure that the vehicle is capable of functioning in accordance with one or more policies. The CSM can be configured to obtain the one or more policies, authenticate the one or more policies, monitor the components of the vehicle and/or inform policy-related components of the vehicle of the one or more policies. The CSM can be configured to validate that the vehicle will comply with one or more policies, for example, by generating and transmitting a compliance certificate to an enforcing authority.

20 Claims, 6 Drawing Sheets

(56) References Cited

U.S. PATENT DOCUMENTS

| | | | |
|---|---|---|---|
| 2018/0218177 A1 | 8/2018 | Kuenemund et al. | |
| 2018/0351941 A1 | 12/2018 | Chhabra | |
| 2020/0298468 A1 | 9/2020 | Drummond et al. | |
| 2020/0304325 A1 | 9/2020 | Denton et al. | |
| 2021/0226802 A1* | 7/2021 | Zhu | H04W 12/06 |
| 2021/0362735 A1* | 11/2021 | Nagao | H04L 9/3247 |
| 2023/0394610 A1* | 12/2023 | Hodge | H04L 67/306 |

FOREIGN PATENT DOCUMENTS

| | | |
|---|---|---|
| CN | 213938413 U | 8/2021 |
| EP | 3836510 A1 | 6/2021 |
| TW | I727358 B | 5/2021 |
| WO | 2023037140 A1 | 3/2023 |

* cited by examiner

300

302   POLICY PROVIDER REGISTERS POLICY FOR COMPLIANCE ZONE AT CENTRAL AUTHORITY

304   CENTRAL AUTHORITY CHECKS AND APPROVES POLICY FOR COMPLIANCE ZONE

306   CENTRAL AUTHORITY SIGNS AND VERIFIES POLICY USING PUBLIC-KEY INFRASTRUCTURE

308   POLICY PROVIDER RECEIVES CRYPTOGRAPHICALLY SIGNED POLICY CERTIFICATE FROM CENTRAL AUTHORITY

310   POLICY BROADCASTER ASSOCIATED WITH POLICY PROVIDER PROVIDES VEHICLE ACCESS TO CRYPTOGRAPHICALLY SIGNED POLICY

312   POLICY BROADCASTER PROVIDES AUTHENTICATION INFORMATION FOR THE POLICY

314   POLICY PROVIDER RECEIVES FROM VEHICLE AND VERIFIES CERTIFICATE OF COMPLIANCE WITH POLICY

316   POLICY PROVIDER REMOVES ACCESS RESTRCITIONS TO THE COMPLIANCE ZONE ASSOCIATED WITH THE POLICY

318   POLICY PROVIDER APPROVES/DENIES REQEUST FROM VEHICLE FOR USE OF NON-COMPLIANT SETTINGS IN COMPLIANCE ZONE

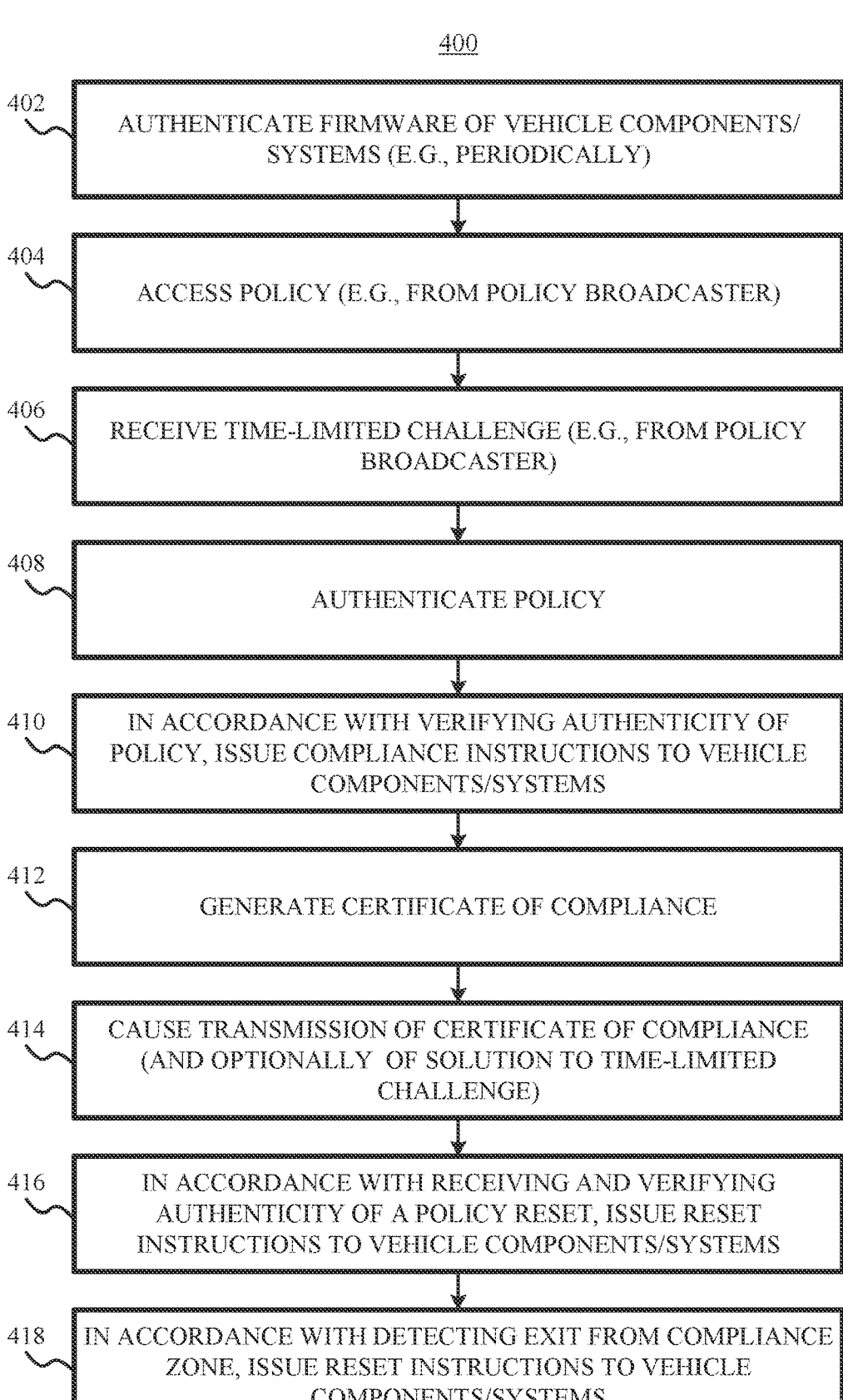

402 — AUTHENTICATE FIRMWARE OF VEHICLE COMPONENTS/ SYSTEMS (E.G., PERIODICALLY)

404 — ACCESS POLICY (E.G., FROM POLICY BROADCASTER)

406 — RECEIVE TIME-LIMITED CHALLENGE (E.G., FROM POLICY BROADCASTER)

408 — AUTHENTICATE POLICY

410 — IN ACCORDANCE WITH VERIFYING AUTHENTICITY OF POLICY, ISSUE COMPLIANCE INSTRUCTIONS TO VEHICLE COMPONENTS/SYSTEMS

412 — GENERATE CERTIFICATE OF COMPLIANCE

414 — CAUSE TRANSMISSION OF CERTIFICATE OF COMPLIANCE (AND OPTIONALLY OF SOLUTION TO TIME-LIMITED CHALLENGE)

416 — IN ACCORDANCE WITH RECEIVING AND VERIFYING AUTHENTICITY OF A POLICY RESET, ISSUE RESET INSTRUCTIONS TO VEHICLE COMPONENTS/SYSTEMS

418 — IN ACCORDANCE WITH DETECTING EXIT FROM COMPLIANCE ZONE, ISSUE RESET INSTRUCTIONS TO VEHICLE COMPONENTS/SYSTEMS

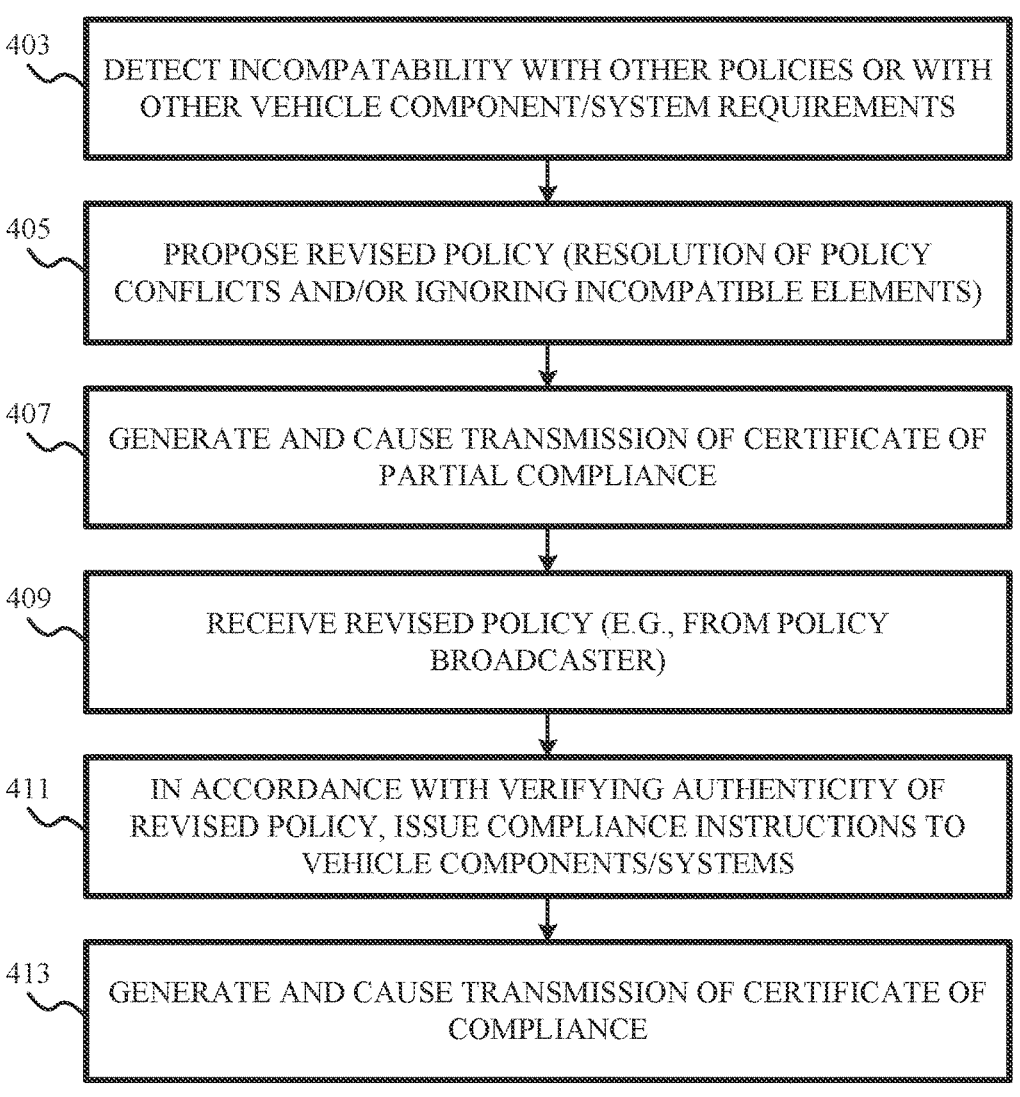

403 DETECT INCOMPATABILITY WITH OTHER POLICIES OR WITH OTHER VEHICLE COMPONENT/SYSTEM REQUIREMENTS

405 PROPOSE REVISED POLICY (RESOLUTION OF POLICY CONFLICTS AND/OR IGNORING INCOMPATIBLE ELEMENTS)

407 GENERATE AND CAUSE TRANSMISSION OF CERTIFICATE OF PARTIAL COMPLIANCE

409 RECEIVE REVISED POLICY (E.G., FROM POLICY BROADCASTER)

411 IN ACCORDANCE WITH VERIFYING AUTHENTICITY OF REVISED POLICY, ISSUE COMPLIANCE INSTRUCTIONS TO VEHICLE COMPONENTS/SYSTEMS

413 GENERATE AND CAUSE TRANSMISSION OF CERTIFICATE OF COMPLIANCE

FIG. 4B

SYSTEMS AND METHODS OF ENFORCING POLICY COMPLIANCE OF VEHICLES

FIELD OF THE DISCLOSURE

This relates to enforcing policy compliance of vehicles.

BACKGROUND OF THE DISCLOSURE

Modern vehicles, such as cars or aerial drones, are incredibly complex, with a wide array of sensors, mobility options and integrated electronic components. While the functionality of such vehicles may be generally accepted and in compliance with the law, there are circumstances where it is desirable for the functionality of a vehicle to depart from the generally accepted functionality according to a policy. An example of a more restrictive policy is a no-fly zone for drones near commercial airports. However, ensuring that vehicles comply with these special policies is difficult due to the wide range of vehicles, vehicle manufacturers, policies, and policy providers.

SUMMARY OF THE DISCLOSURE

This relates to systems and methods of enforcing policy compliance of vehicles when navigating in areas with special policies (e.g., vehicle behavior policies). The vehicle includes a compliance security module (CSM) configured to ensure that the vehicle is capable of functioning in accordance with the one or more policies. The CSM can be configured to obtain one or more policies (e.g., using location-based geofencing or vehicle-to-everything (V2X) messages). The CSM can be configured to authenticate the one or more policies. The CSM can be configured to monitor the components of the vehicle and/or inform or instruct policy-related components (e.g., sensors, motor control units etc.) of the vehicle of the new policy. The CSM can be configured to validate that the vehicle will comply with one or more policies (e.g., generate a compliance certificate and transmit the compliance certificate to an external party). Optionally, the CSM is configured to receive remote attestation of compliance from the components and/or perform firmware verification of the components. The compliance certificate can be verified by the external party to confirm compliance by the vehicle.

BRIEF DESCRIPTION OF THE DRAWINGS

FIG. 3 illustrates an example process for registering and providing access to a policy for operating a vehicle according to embodiments of the disclosure.

FIG. 4A illustrates an example process for enforcing a policy for operating a vehicle according to embodiments of the disclosure.

FIG. 4B illustrates an example process for managing multiple policies and/or negotiating modifications to a policy for operating a vehicle according to embodiments of the disclosure.

DETAILED DESCRIPTION

This relates to systems and methods of enforcing policy compliance of vehicles when navigating in areas with special policies (e.g., vehicle behavior policies). The vehicle includes a compliance security module (CSM), also referred to herein as a compliance security circuit or compliance security circuitry, configured to ensure that the vehicle is capable of functioning in accordance with the one or more policies. The CSM can be configured to obtain one or more policies (e.g., using location-based geofencing or V2X messages). The CSM can be configured to authenticate the one or more policies from a policy provider. The CSM can be configured to monitor the components of the vehicle and/or inform or instruct policy-related components (e.g., sensors, motor control units etc.) of the vehicle of the new policy. The CSM can be configured to validate that the vehicle will comply with one or more policies (e.g., generate a compliance certificate and transmit the compliance certificate to an external party). Optionally, the CSM is configured to receive remote attestation of compliance from the components and/or perform firmware verification of the components. The compliance certificate can be verified by the external party to confirm compliance by the vehicle.

The CSM described herein can be included a variety of vehicles to receive a variety of policies from a variety of policy providers. Non-limiting examples of vehicles include non-autonomous, semi-autonomous, or autonomous automobiles or industrial vehicles, uncrewed or crewed aerial vehicles or watercrafts (e.g., planes, drones, boats, submersibles), etc. Non-limiting examples of policy providers and policies include a military base or secure facility requiring disabling cameras and radar sensors on their compound to prevent espionage; a local administration enforcing noise restrictions on engines in neighborhoods at night; highway police enforcing the use of hazard lights during low visibility conditions; an environmental agency restricting the brightness of high beams in nature reserves; an airport traffic control enforcing a no-fly zone around the airport; a harbor enforcing fuel restrictions to prevent a ship engine to burn heavy fuel oil (or bunker fuel) while in the port; or a radio astronomy site restricting electromagnetic emissions (e.g., radio, etc.) of vehicles inside the radio exclusion zone.

Figure 1A:
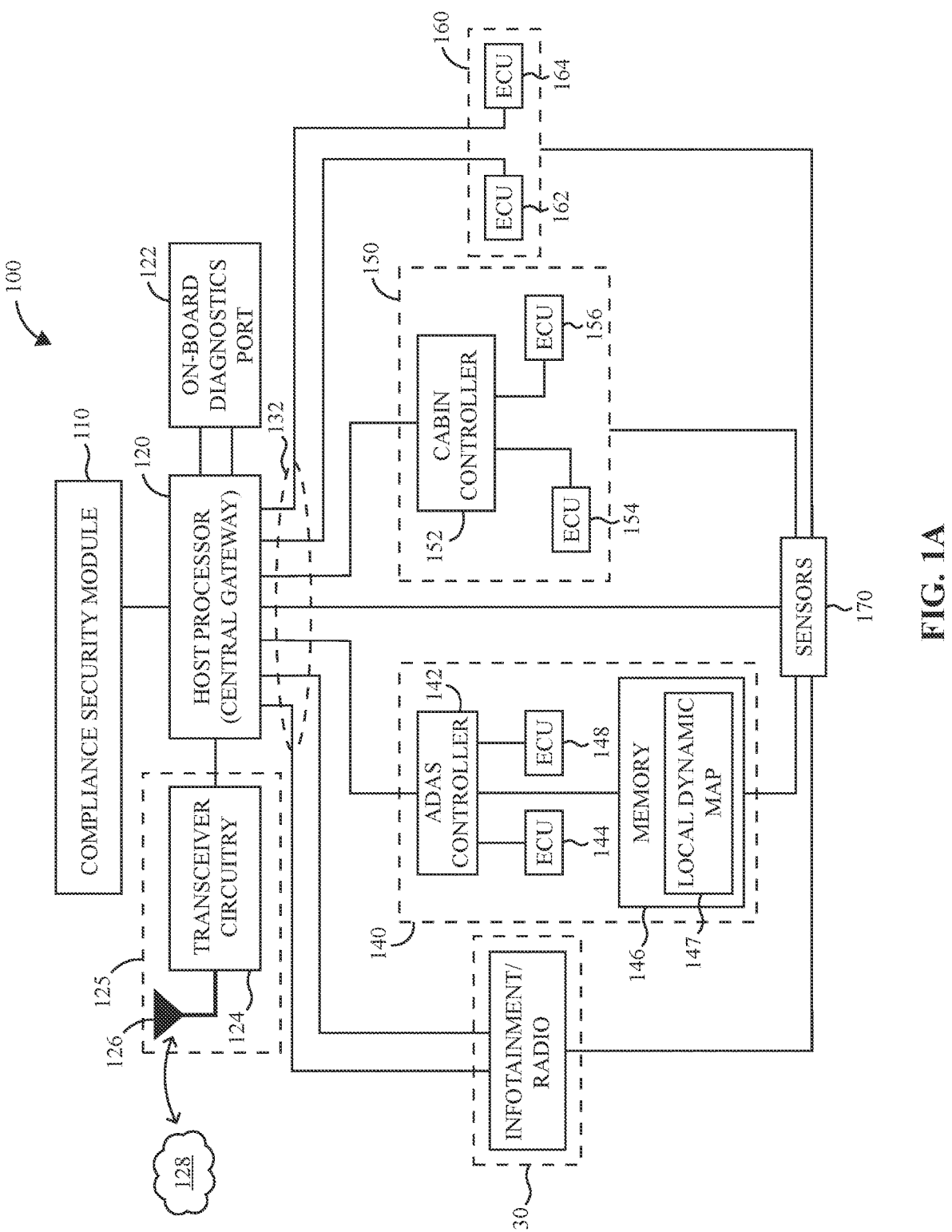
FIG. 1A illustrates an example compliance enforcement system for a vehicle with multiple components according to embodiments of the disclosure.

FIG. 1A illustrates a block diagram of a vehicle 100 including a compliance management system according to embodiments of the disclosure. Vehicle 100 may represent any suitable vehicle including, for example, an uncrewed aerial vehicle (UAV), unpiloted or remotely piloted aerial vehicle, crewed or uncrewed aircraft system, a driver-controlled vehicle, a remotely controlled vehicle, or an autonomous vehicle, (e.g., self-driving vehicle, driverless vehicle, or any other vehicle that can guide itself without human conduction).

The block diagram includes compliance security module 110, host processor 120 (optionally corresponding to a central gateway), infotainment system 130, autonomous driving or driver assistance system 140, cabin control system 150, and vehicle power train and dynamics system 160. Additionally, the block diagram includes sensors 170 and communication circuitry 125. The above described components communicate using one or more communication buses 132, and access to the above described components or communication buses is available via an on-board diagnostic port 122. It is understood that the block diagram of FIG. 1A represents a non-limiting architecture and other vehicle architectures may include fewer, additional, or different components in a different configuration. For example, an uncrewed vehicle may not include an infotainment system 130 or cabin control system 150. Additionally it is understood that the connections shown between components in FIG. 1A are non-limiting, and other architectures may include fewer, additional, or different connections between components. Other structural mechanical aspects of the vehicle such as motors, frames, wings, tires, etc. are not shown.

Host processor 120 may be a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, a microcontroller, or a state machine, combinations of the same, or the like. A processor can include electrical circuitry configured to process computer-executable instructions (e.g., stored in a memory). Host processor 120 can also be implemented as a combination of computing devices. For example, a combination of a DSP and a microprocessor, a plurality of microprocessors, one or more microprocessors in conjunction with a DSP core, or any other such configuration. Although described herein primarily with respect to digital technology, a processor may also include analog components or mixed analog and digital circuitry. Host processor 120 may include an artificial intelligence (AI) and/or machine learning (ML) engine. The terms "engine," "algorithm," "module," as used herein, often refers to logic embodied in hardware or firmware and/or to a collection of software instructions written in a programming language and executed by host processor 120.

In some embodiments, the host processor controls and/or interacts with the various electronic control units (ECUs) or other circuitry corresponding to infotainment system 130, autonomous driving or driver assistance system 140, cabin control system 150, and vehicle power train and dynamics system 160. The individual ECUs or other controller circuitry may be implemented in the same or a similar manner as described above for the host processor. In some embodiments, the processing functionality of vehicle 100 are distributed amongst the various ECUs and the host processor 120, and host processor 120 is implemented as a gateway for secure communications and processing.

The infotainment system 130 can include one or more instrument clusters, an audio system including radio (e.g., amplitude modulate, frequency modulated, satellite) and one or more speakers, and one or more displays. The infotainment system 130 optionally includes one or more ECUs or controllers (not shown) in communication with host processor 120 using one or more communication buses.

The autonomous driving or driver assistance system 140 can include an adaptive driver assistance system (ADAS) controller/engine 142 and one or more ECUs in communication with host processor 120 using one or more communication buses. For example, ECUs 144 and 148 are shown coupled to ADAS controller/engine 142 via two separate communication buses, and to host processor 120 through one communication bus, though a different number of ECUs and communication buses is possible. The autonomous driving or driver assistance system 140 can include ECUs implementing an automated driving module, a driver assistance module, an automotive vision module, an automotive radar module, a driver or occupant monitoring system, a pedestrian avoidance module, a collision avoidance module, and a blind spot monitoring module, among other possibilities. The autonomous driving or driver assistance system 140 can also include or access a memory 146, storing a local dynamic map 147 with static and dynamic data (e.g., map data, policy data, traffic signal data, vehicles, pedestrians, etc.).

The cabin control system 150 can include a cabin controller/engine 152 and one or more ECUs in communication with host processor 120 using one or more communication buses. For example, ECUs 154 and 156 are shown coupled to cabin controller/engine 152 via two separate communication buses, and to host processor 120 through one communication bus, though a different number of ECUs and communication buses is possible. The cabin control system 150 can include ECUs implementing a body control module, a seat control module, a climate control module, a door control module, an airbag control module, a lighting control module, a wiper control module, and a mirror control module, among other possibilities.

The vehicle power train and dynamics system 160 can include one or more ECUs in communication with host processor 120 using one or more communication buses. For example, ECUs 162 and 164 are shown coupled to host processor 120 via two separate communication buses, though a different number of ECUs and communication buses is possible. The vehicle power train and dynamics system 160 can include ECUs implementing an engine control module, a powertrain control module, a power steering module, a transmission control module, a brake control module, and a suspension control module, among other possibilities.

Sensors 170 optionally include long range radar, short range radar, ultra-wide band radar, photographic cameras, video cameras, infrared cameras, multi spectral cameras, lidar, sonar, etc. for detecting the environment around the vehicle. Sensors 170 optionally include a global navigation satellite system (GLONASS) receiver or a global position system (GPS) receiver to detect the position and/or motion of the vehicle. Sensors 170 optionally include other motion sensors to detect motion of the vehicle, such as inertial sensors or accelerometers. These example sensors are non-limiting and sensors 170 optionally include other sensors. Sensors 170 are coupled to one or more of the vehicle systems and/or to host processor 120. For example, position sensors, imaging sensors, and ranging sensors of sensor 170 can be used by autonomous driving or driver assistance system 140.

Communication circuitry 125 includes an antenna 126 and transceiver circuitry 124. Alternatively, the communication circuitry includes a dedicated receiver antenna and receiver circuitry and a dedicated transmitter antenna and transmitter circuitry. The communication circuitry enables communication with other systems (e.g., for receiving a policy or transmitting a certificate of compliance) via network 128. In some embodiments, the wireless communication may be established using V2X communication (e.g., with external entities, traffic signals, etc.). In some embodiments, wireless communication may be established based on a dedicated short-range communications (DSRC) technology. DSRC is an open source protocol for wireless communication that is intended for highly secure, high-speed wireless communication between vehicles and the infrastructure. Some functional attributes of DSRC are low latency, limited interference, and strong performance during adverse weather conditions. In terms of low latency, delays involved in opening and closing a wireless connection are very short (e.g., on the order of 20 milliseconds). In terms of limited interference, DSRC is very robust in the face of radio interference. Additionally, DSRC may enable a communication range of greater than 1.5 km to accommodate the compliance enforcement processes described herein before entering a compliance zone, while still having a short enough communication range to reduce the potential for interference from distant sources. DSRC technology implements IEEE 802.11p in the 5.9 GHz band, and is to be used for vehicle safety and other mobility applications. Although DSRC technology is mentioned herein for establishing wireless communication using communication circuitry 125, other suitable network-based (e.g., wireless local area network (WLAN)) or cellular-based vehicular communication systems may be implemented.

Communication buses 132 optionally include local interconnect network (LIN) buses, controller area network (CAN) buses, FlexRay communication buses, and Ethernet buses, among other possibilities.

CSM 110 is optionally a special security processor implemented in as a secure element or hardware security module that is resistance to tampering. CSM 110 is implemented using hardware, optionally programmed or executing instructions associated with firmware and/or software. In some embodiments, CSM 110 is configured to access one or more policies associated with respective compliance zones, authenticate the one or more policies, and in accordance with a determination that the one or more vehicle systems are operating in compliance with the one or more policies, cause transmission of a certificate of compliance indicating that the one or more vehicle components are operating in compliance with the one or more policies. In some embodiments, CSM 110 is configured to continuously verify the firmware (e.g., software programmed into memory, optionally a read-only memory and optionally including instructions for hardware start up and basic communication and input/output functionality) of all applicable electronic components of the vehicle (e.g., sensors 170, infotainment system 130, autonomous driving or driver assistance system 140, cabin control system 150, and vehicle power train and dynamics system 160), using techniques such as secure remote attestation and/or secure boot. In some embodiments, when CSM 110 verifies all firmware images (no unauthorized modification) and/or otherwise certifies that the components of vehicle 100 will comply with requests by the CSM 110 (e.g., to comply with a CSM-authenticated policy), the CSM confirms that requests will be followed. As used herein, a compliance enforcement system includes a compliance security module and optionally some associated vehicle components such as communication circuitry 125 and/or memory storing a local dynamic map 147 for receiving a policy and/or transmitting a compliance certificate.

Figure 1B:
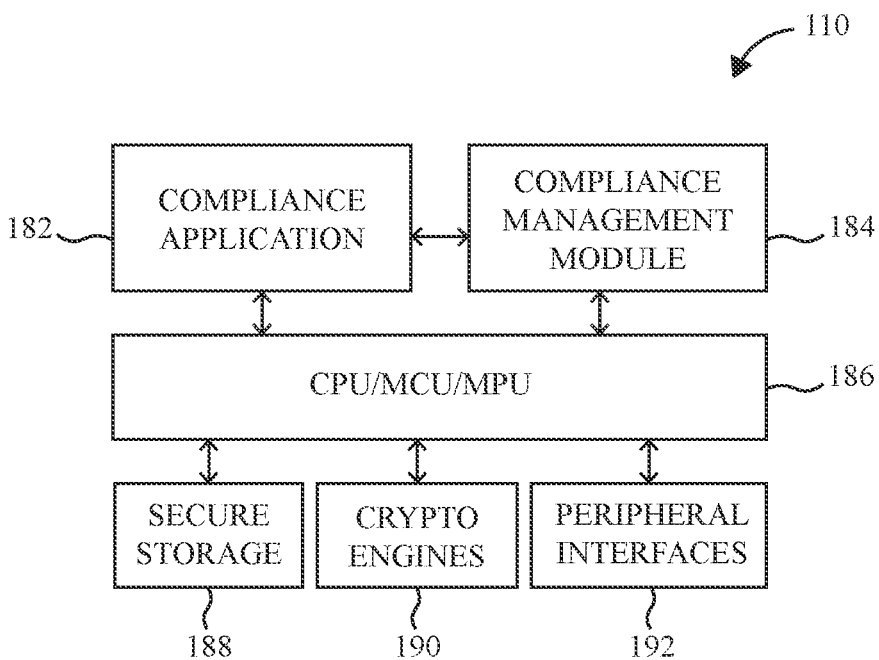
FIG. 1B illustrates a block diagram of an example compliance security module of the compliance enforcement system according to embodiments of the disclosure.

FIG. 1B illustrates a block diagram of an example compliance security module 110 of the compliance enforcement system according to embodiments of the disclosure. The block diagram includes a compliance application 182, a compliance management module 184, a compliance processor 186, a secure storage element 188, a cryptography engine 190, and a peripheral interface module 192.

Compliance processor 186 can be any suitable processor such as ARM-based or PowerPC-based based microcontroller units (MCUs), microprocessor units (MPUs) or central processing units (CPUs). Compliance processor 186 can be configured to perform the compliance enforcement processes described herein (e.g., in the context of FIGS. 3 and 4A-4B) in accordance with the cryptography engine 190. Optionally, the compliance enforcement processes described herein are stored as instructions in compliance application 182 and are executed by the compliance processor 186 in accordance with compliance management module 184 (e.g., configuration and data parameters for the compliance application 182).

Cryptography engine 190 (also referred to as a cryptographic hardware co-processor or cryptographic services circuitry) can include a high-speed public-key coprocessor (PKC) supporting one or more public key cryptographic systems such as Data Encryption Standard (DES) algorithm, Advanced Encryption Standard (AES) algorithm, Rivest-Shamir-Adleman (RSA) algorithm, elliptic curve cryptography (ECC) algorithm, secure hash or cipher algorithms, or any other suitable algorithm. Cryptography engine 190 is configured to decrypt or otherwise authenticate data received by CSM 110 (e.g., a policy) and/or encrypt data transferred from the CSM 110 (e.g., a compliance certificate). Additionally or alternatively, cryptography engine 190 can be used to check authenticity and integrity of other components of vehicle 100. For example, cryptography engine 190 can verify that firmware of various sensors (e.g., sensors 170) and/or systems (e.g., systems 130, 140, 150, or 160) are untampered with.

Secure storage element 188 (e.g., secure memory 188) optionally stores compliance application 182 and/or compliance management module 184 for use by compliance processor 186 in performing the compliance enforcement processes described herein. Additionally or alternatively, secure storage element 188 includes data (e.g., keys, ciphers, hash, etc.) supporting cryptography operations by cryptography engine 190. Additionally or alternatively, in some embodiments, policies implicated by local dynamic maps (or local dynamic maps 147) are stored in secure storage element 188. In some embodiments, rather than obtaining policies from a policy provider via communication circuitry 125 (e.g., a broadcast), policies can be obtained from secure storage element 188 in accordance with the vehicle position (e.g., from GPS or GLONASS receivers).

Peripheral interface module 192 (also referred to herein as input/output (I/O) circuitry) provides a communication interface for communication with other components of vehicle 100. For example, peripheral interface module 192 optionally enable serial peripheral interface (SPI) or inter-integrated circuit (I2C) communications, among other possible communication protocols.

Figure 2:
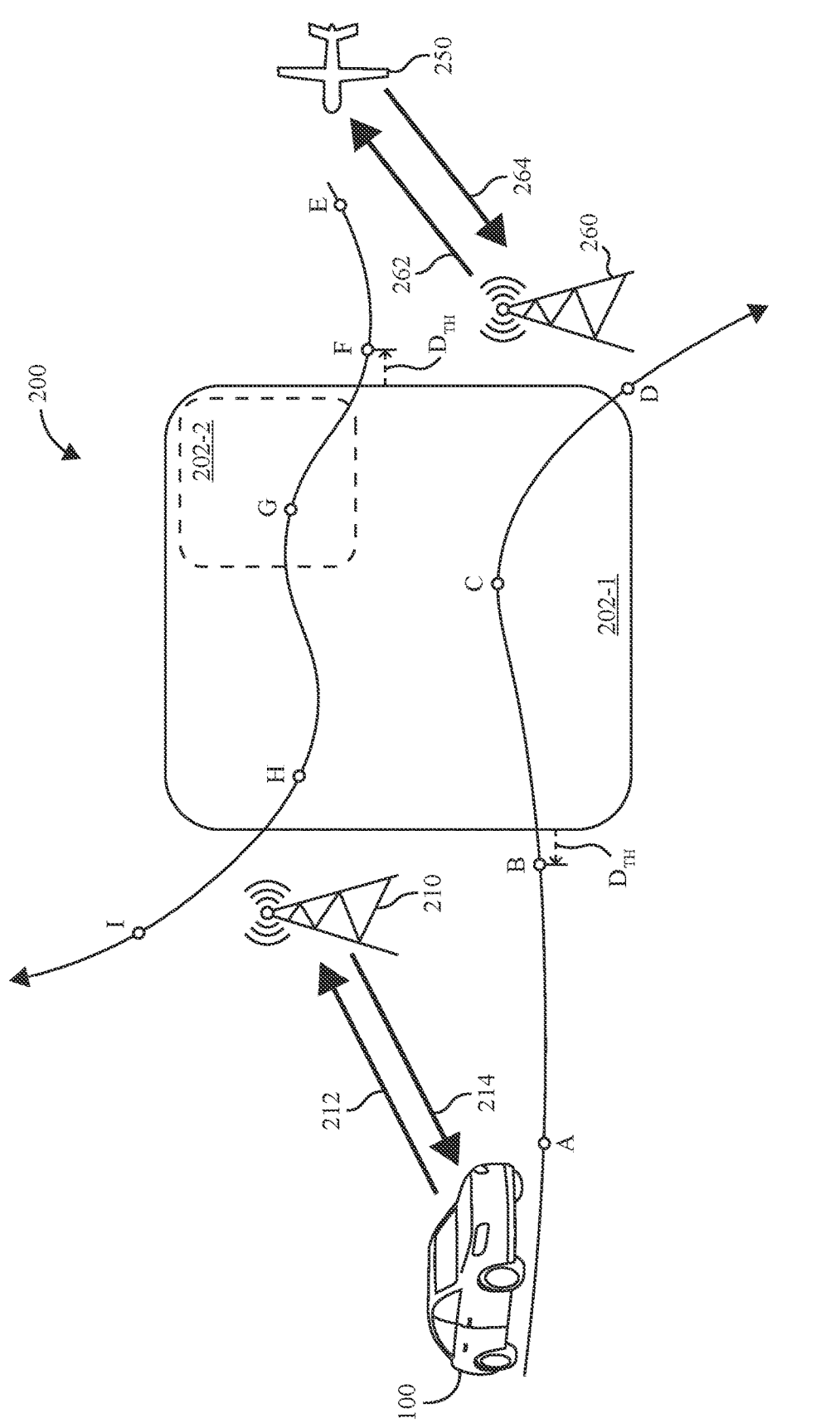
FIG. 2 illustrates a simplified plan view of a map indicating vehicles, policy broadcasters, and compliance zones in which policies for operating the vehicles are enforced according to embodiments of the disclosure.

As described herein, CSM 110 can be used to authenticate policies corresponding to a compliance zone and to ensure compliance of vehicle 100 with the authenticated policies while operating within the compliance zone. FIG. 2 illustrates a simplified plan view of a map 200 indicating vehicles 100 and 250, policy broadcasters 210 and 260, and compliance zones 202-1 and 202-2. As shown in FIG. 2, compliance zone 202-2 is within (or at least overlaps with) compliance zone 202-1. Policies for operating vehicles 100 and 250 in compliance zones 202-1 and 202-2 can be set by an enforcing authority/policy provider (e.g., an airport authority, a military authority, a highway authority, or any suitable private or governmental authority) and enforced in conjunction with a vehicle compliance enforcement systems including a CSM 110. Non-limiting examples of a policy include a no-fly zone for drones around an airport, an upper limit to automotive engine noise in a residential neighborhood, disabling the camera, lidar and/or radar sensors of cars inside a military base to prevent espionage, or disabling radio emissions inside radio exclusion zones near radio astronomy sites. The enforcing authority can operate one or more policy broadcasters in the designated areas, which broadcast policy messages containing the policy certificate.

In particular, vehicle 100 including a first compliance enforcement system is represented on map 200 as an autonomous, semi-autonomous, or a non-autonomous ground transportation vehicle. Vehicle 100 can follow path 220, with points A, B, C, and D representing locations on the path 220. Portions of path 220, such as point C, can be within compliance zone 202-1. Similarly, vehicle 250 including a second compliance enforcement system is represented on map 200 as an autonomous, semi-autonomous, or non-autonomous aerial transportation vehicle (e.g., a multirotor, fixed-wing, or other aircraft). Vehicle 250 can follow path 270, with points E, F, G, H, and I representing locations on the path 270. Portions of path 270, such as points G and H, can be within compliance zone 202-1. Portions of path 270, such as point G, can be within both compliance zones 202-1 and 202-2.

Illustrated vehicles 100 and 250 each contain a respective compliance enforcement system including a respective CSM (e.g., corresponding to CSM 110 described above in connection with FIGS. 1A-1B). CSM 110 of each vehicle can be communicatively coupled by communication circuitry 125 to policy broadcasters 210 and 260 when in a communication range suitable for the policy broadcasters and CSMs. It is understood that the transmission communication range for a policy broadcaster may be different than the transmission communication range for a CSM.

In general, the compliance enforcement system of a respective vehicle can be communicatively coupled to a policy broadcaster prior to the vehicle entering a compliance zone (e.g., while approaching a compliance zone) and/or while the vehicle is within a compliance zone (e.g., during at least a portion of the time required by a vehicle to traverse any given path going through at least one compliance zone). In some embodiments, the communication range of a respective policy broadcaster enables communication of a policy from the respective policy broadcaster to a respective vehicle at least once before entering a respective compliance zone and a communication range of a CSM enables a communication of a certificate of compliance at least once from a respective CSM 110 to the policy broadcaster and/or the policy provider. In some embodiments, the communication range enables unidirectional communication (e.g., policy broadcaster to vehicle or vehicle to policy broadcaster or another entity) or bidirectional communication for the entirety of the duration of vehicle operation with the compliance zones. As an example, the CSM 110 of vehicle 100 can be communicatively coupled to policy broadcaster 210 while within communication range of policy broadcaster 210 at points A and B prior to entering compliance zone 202-1, and point C within compliance zone 202-1, whereas CSM 110 of vehicle 100 can be communicatively decoupled from policy broadcaster 210 at point D, which is outside of the communication range of policy broadcaster 210. As another example, the CSM 110 of vehicle 250 can be communicatively coupled to policy broadcaster 260 while within communication range of policy broadcaster 260 at points E and F prior to entering compliance zone 202-1, and points G and H within compliance zones 202-1 and/or 202-2, whereas CSM 110 of vehicle 250 can be communicatively decoupled from policy broadcaster 260 at point I, which is outside of the communication range of policy broadcaster 260.

Additionally, in some embodiments, the compliance enforcement system of a respective vehicle can be communicatively coupled to a policy broadcaster after leaving a compliance zone (e.g., after having left compliance zone boundaries), for example, to receive an indication that the policy no longer applies outside of the compliance zone. In some embodiments, vehicle 100 can be communicatively coupled to policy broadcaster 210 at point D (and vehicle 250 can be communicatively coupled to policy broadcaster 260 at point I) to receive such an indication (e.g., a reset policy). In some embodiments, vehicle 100 can be additionally or alternatively communicatively coupled to policy broadcaster 260 at point D (and vehicle 250 can be communicatively coupled to policy broadcaster 210 at point I).

Policy broadcasters 210 and 260 can represent a road-side unit (RSU), or any other suitable structure for wirelessly broadcasting/transmitting messages to, and receiving messages from, vehicles such as 100 and 250 (e.g., using V2X or cellular 5G/6G). As an example, policy broadcasters can be integrated into a road sign that visually indicates policy recommendations or guidance (e.g., a road sign indicating recommended speed limits, or upcoming road geometry/conditions). As another example, policy broadcasters can be integrated into vehicles that are either stationary or moving. As yet another example, policy broadcasters can be integrated into road or traffic barrier structures for gating vehicle access to a particular region (e.g., barrier gate arms, retractable bollards, retractable spike strips, etc.). Policy broadcasters 210 and 260 can broadcast messages to and receive messages from vehicles 100 and 250 using any suitable wireless communications protocol (e.g. V2X—vehicle to everything, Wi-Fi, LoRa—long range radio, cellular 5G/6G, etc.). Although referred to as a "broadcaster" it is understood that the transmitting and receiving functions can be integrated in an illustrated policy broadcaster, or alternatively the transmitting and receiving functions can be implemented independently (e.g., a policy transmitter and a policy receiver).

In some embodiments, policies can be stored locally at the compliance enforcement system of a vehicle, such as in secure memory 188 of CSM 110. In some such embodiments, policies can be associated with regions of a local dynamic map (LDM) that includes a map layer comprising geographic map data, and a policy layer comprising policy data associated with regions or zones of the geographic map data. The vehicle can use GLONASS or GPS (or another suitable receiver) to detect the position of the vehicle and access policies from the LDM for compliance enforcement. In some embodiments, locally stored policies can be accessed after being received from transmissions by policy broadcasters (e.g., 210 or 260) and stored in memory, or after being retrieved from another policy source (e.g., a policy repository maintained by some central authority).

In some embodiments, policy broadcasters can transmit to a vehicle policies applicable to upcoming compliance zones (e.g., compliance zones through which a vehicle will pass on its path or in within a threshold distance ($D_{TH}$) of the vehicle, such as within 2 km, 1 km, 200 m) and/or details regarding the compliance zone (e.g., geographic limits of the compliance zone). As an example, broadcast 212 from policy broadcaster 210 to vehicle 100 can indicate the transmission of a policy for compliance zone 202-1 and/or compliance zone 202-2. As another example, broadcast 262 from policy broadcaster 260 to vehicle 250 can indicate the transmission of respective policies for compliance zone 202-1 and/or compliance zone 202-2. In some embodiments, a policy broadcaster can receive vehicle path information from a vehicle prior to transmitting policies relevant to the vehicle path to the vehicle (e.g., such that vehicle 250 will receive policies relevant to compliance zone 202-2, whereas vehicle 100 will not). In other embodiments, a policy broadcaster can transmit policies for all compliance zones within a certain distance of the broadcaster (e.g., when a vehicle path is not yet known or fully determined/specified). Upon receiving one or more policies from the policy broadcaster, CSM 110 associated with a vehicle can authenticate the policies before modifying any navigation or control functions of the vehicle and can ensure compliance with the policies in the appropriate compliance zone.

Broadcasts 212 and 262 by policy broadcasters 210 and 260 can include information required to authenticate the policy, such as cryptographic signatures that can be decrypted and/or verified by the CSM 110 of a vehicle (e.g., using cryptographic services circuitry 190). In some embodiments, a central authority can be responsible for checking and approving policies, as well as maintaining a public-key infrastructure (PKI) to sign and verify policies. Such a central authority can maintain a repository of policies that have been checked, approved, signed, and verified in this manner (e.g., sometimes referred to herein as policy certificates). Policy broadcasts can include: information specifying geographic boundaries of compliance zones (e.g., geographic area(s)), time periods during which said policies are active and enforced (e.g., time interval(s)), applicable vehicles that should follow the policy (e.g., vehicle type(s) or vehicle identification(s)), wireless communication protocols, details of how to comply with the policy, acceptable formats for responding to the policy broadcast, a priority of the policy or an element of a policy (e.g., low/high priority, or a numerical rank), an indication of whether the policy is an enforced policy (e.g., specified static and dynamic settings), a guidance policy (e.g., negotiable settings), or an informational policy (e.g., recommended settings), a policy certificate for authorizing the policy (e.g., a cryptographically signed policy that can be decrypted using a public key of the central authority or its policy repository), a public key for decrypting the cryptographically signed policy, and/or end-of-policy information (e.g., settings that can be applied outside compliance zones or time periods). In some embodiments, policy broadcasts are encrypted communications, and the policy broadcasts do not include the public key for decrypting the policy certificate (which may be present in CSM 110).

Policies received via broadcasts 212 and/or 262 can authenticated by CSM 110 in a vehicle, in some embodiments, by decrypting or verifying the policy certificate associated with the policy using the public key of the central authority or its policy repository. Using a public key associated with a central entity or authority responsible for signing policies and maintaining a policy repository, cryptographic services circuitry 190 of compliance security module 110 can decrypt or verify a policy certificate. The public key required to decrypt or verify the policy certificate can be received either via broadcasts such as 212 or 262 or via another access method (e.g., accessing a public key stored in secure memory 188 or requesting access to the public key from a third party entity via network 128).

Along with policy broadcasts, policy broadcasters can optionally transmit time-based challenges to vehicles. Time-based challenges can be used to prevent attacks on the compliance enforcement network/infrastructure that maliciously or fraudulently replay data transmission associated with confirming compliance of a vehicle. Including a time-based challenge in the policy broadcast can provide a layer of protection against such attacks, as each policy broadcast will have a unique time-based challenge that cannot be satisfied by a solution to a different time-based challenge.

After authenticating a policy received by a policy broadcast, a vehicle can implement the policy and/or store the policy for later retrieval. As an example, a vehicle can incorporate the policy received by the policy broadcast into a local dynamic map (LDM) of map 200. An LDM for map 200 can include various layers of data that are indexed by, or otherwise associated with, locations on the map. One such layer of data can be a policy layer, in which policies are associated with (e.g., indexed by) regions, zones, or areas on the map or LDM. When a vehicle stores an LDM for map 200 and/or policies associated with the map 200 in the memory of CSM 110, the policies can be automatically retrieved by CSM 110 for optional re-authentication and enforcement of the policy when the vehicle approaches and/or remains within a compliance zone (e.g., 202-1 or 202-2). The LDM could be updated via the internet or during vehicle maintenance to reflect the most updated policies.

A vehicle 100 or 250 can access and authenticate a policy as the vehicle approaches a compliance zone 202-1 or 202-2 (e.g., with threshold distance $D_{TH}$ of the compliance zone 202-1). After authentication, the vehicle can parse one or more enforced policies associated with an approaching compliance zone for specified static and dynamic settings for operating components of the vehicle (e.g., sensors 170, systems 130, 140, 150 and 160 of FIG. 1A). Policy-specified static and dynamic settings can be referred to as "compliance instructions" that can be issued or transmitted to components and systems of the vehicle by I/O circuitry 192 of a CSM 110. The static settings specified by a policy can include a list of setting changes to individual components and/or systems of the vehicle, whereas dynamic settings specified by a policy can include a list of conditional or time-varying settings changes to individual components and/or systems of the vehicle.

Upon parsing the compliance instructions from an authenticated policy, a compliance security module 110 can issue the compliance instructions the relevant components and/or systems of the vehicle by I/O circuitry 192. Component/ system firmware that has been verified by compliance security module 110 to be authentic can be certified to comply with the compliance instructions. In some embodiments, upon issuance of the compliance instructions to a respective component/system of vehicle 100 or 250, the CSM 110 can assume that the component/system with verified firmware that is issued the compliance instructions is operating in compliance with the compliance instructions (e.g., the policy-specified static and dynamic settings are in effect). Additionally or alternatively, in some embodiments, the CSM 110 can request confirmation from the component/ system that the component/system is in fact operating in compliance with the compliance instructions. CSM 110 can request, via I/O circuitry 192 of compliance security module 110, certifications that indicate compliance with the policy-specified static and dynamic settings from each component/ system of the vehicle. In this way, the CSM 110 can certify compliance of each component/system of the vehicle whose settings are modified by the compliance instructions generated based on an authenticated policy.

CSM 110 can compile a certification of compliance indicating policy-specified static and dynamic settings are being used in operation of the vehicle from each of the components and/or systems of the vehicle affected by the policy. Additionally or alternatively, the certification of compliance indicates that the verification of the firmware for the vehicle systems implicated by the compliance zone policy or policies.

A compliance enforcement system can cause a transmission 214 or 264 containing a compliance certificate (e.g., from the CSM 110) that indicates compliance of the vehicle (and its constituent components) with the policy applicable to the relevant compliance zone. Transmission 214 or 264 can additionally include a solution to the time-based challenge provided to the compliance enforcement system in broadcast 212 or 262.

Policy broadcaster 210 or 260 can receive transmission 214 or 264 including the compliance certificate, and in response, remove access restrictions to the compliance zone 202-1 or compliance zone 202-2. For example, compliance zone 202-1 can correspond to a secured installation (e.g., a military base) and removal of access restrictions can include opening a gate and/or otherwise permitting entrance of vehicle 100 into compliance zone 202-1. As another example, compliance zone 202-1 or compliance zone 202-2 can correspond to an airport and removal of access restrictions can include allowing vehicle 250 permission to fly through the airspace or land at the airport in compliance zone 202-1 (while maintaining a no-fly zone in compliance zone 202-2). It is understood that a secured installation or airport are merely examples, and compliance zones can be operated local authorities, highway authorities, or others.

FIG. 3 illustrates an example process 300 for registering and providing access to a policy for operating a vehicle according to embodiments of the disclosure. At 302, a policy provider (also referred to herein as an enforcing authority) that wishes to enforce a behavioral policy on vehicles in a compliance zone (e.g., a designated area or path) registers the policy with a central authority (e.g., submits the policy to a policy repository operated by a central authority, also referred to as an authorizer authority). At 304, the central authority, which is responsible for checking and approving policies and also maintaining a public-key infrastructure (or other cryptographic techniques) to sign and verify policies, checks and approves the registered policy for the compliance zone. The central authority may have legal authority allowing the central authority to issue a policy provider permission to enforce predefined policies in a compliance zone. At 306, in accordance with approval of the policy, the central authority signs and verifies the policy. In some embodiments, the central authority signs and verifies the policy using the public-key infrastructure (or other suitable cryptographic techniques).

At 308, the policy provider receives a cryptographically-signed policy certificate. The policy certificate contains the policy contents in a computer-readable format. As described above in the description of FIG. 2, the policy certificate optionally includes information such as a location where the policy should be followed (e.g., boundaries of a compliance zone), what vehicles should follow the policy, at what time the policy is active, how to comply to the policy, and how to respond to receipt of a policy from a policy provider. The policy can have one or more elements with different priority types ("enforced," "guidance," "informational," etc.), depending on whether a given policy element is mandatory, recommended, or purely for information purposes. The policy could also have additional instructions, such as the communication techniques to relay the policy (e.g., V2X or cellular network). In some embodiments, the policy also includes dynamic elements that tie the policy to external factors (e.g., based on the presence of other vehicles, based on the proximity to other vehicles, based on the number of vehicles in the compliance zone, based on the presence of people, based on the proximity to people, based on the number of people in the compliance zone, etc.).

At 310, the policy provider provides a vehicle access to the cryptographically signed policy. For example, the policy provider operates or is associated with an operator of a policy broadcaster in or near the compliance zones, which broadcast policy messages including the policy certificate. Vehicles approaching or entering the compliance zones including the CSM can receive the policy message containing the policy certificate. At 312, the policy provider also broadcasts authentication information for the policy. For example, the authentication information optionally includes a time-limited challenge (e.g., to prevent or reduce risk of a replay attack) or public keys or other cryptographic information (e.g., for decrypting and/or authenticating the policy at the CSM of the vehicle).

At 314, the policy provider receives (e.g., via the policy broadcaster or via alternative means) and verifies a certificate of compliance with the policy from the vehicle. In some embodiments, the authenticity of the certificate of compliance is verified using a PKI maintained by the CSM manufacturer (or using other suitable verification means). At 316, in accordance with receipt and verification of the certificate of compliance, the policy provider removes access restrictions to the compliance zone associated with the policy for the vehicle. For example, an enforcing authority allow the vehicle to enter inside an otherwise gated-off area corresponding to the compliance zone. When a certificate of compliance is not received and/or verified, the policy provider does not remove access restrictions to the compliance zone associated with the policy for the vehicle. In some embodiments, at 318, the policy provider optionally negotiates access to the compliance zone when only partial compliance is offered or available to the vehicle (e.g., an autonomous car cannot completely turn of radar sensors needed for driving). For example, after receiving the policy, the CSM and the policy provider can enter into a negotiation phase. During the negotiation phase, policy provider can decide whether to approve or deny a request from a vehicle for use of non-compliant or partially compliant settings in the compliance zone. Additional details regarding negotiation are described below in the context of process 401 in FIG. 4B.

It is understood that the operations and order of operations described with respect to process 300 represent one embodiment. It is understood that, in some embodiments, some of the operations can be performed and other operations can be omitted. For example, in some embodiments, operations at 310, 314, and 316 are performed and operations at 302-308, 312, and 318 can be omitted. It is understood that, in some embodiments, some of the operations can be performed in a different order and/or in parallel. For example, in some embodiments, operation at 318 can be performed prior to receipt of a certification of compliance at 314, and operations at 310 and at 312 can be performed in parallel. The operations of process 300 are optionally implemented by a computing system associated with an enforcing authority including a processor (e.g., as described with respect to host processor 120 of FIG. 1A) and memory or other non-transitory computer readable storage medium (excluding signals) storing instructions or one or more computer programs to perform the operations of process 300.

FIG. 4A illustrates an example process 400 for enforcing a policy for operating a vehicle according to embodiments of the disclosure. Process 400 is implemented by a compliance enforcement system including CSM 110. At 402, the CSM verifies that components of a vehicle have not been tampered with by authenticating the firmware of the components and/or systems of a vehicle. In some embodiments, the verification of components and/or systems is a continuous operation. In some embodiments, verification is periodic, trigger-based (e.g., start up, reverification requests, or based on receipt of a policy from a policy provider), time-based (e.g. at specific times/dates or after a threshold amount of time since the last verification), distance-based (after a threshold distance traveled by the vehicle or within a threshold distance of a compliance zone), etc. The firmware authorization can be performed using cryptographic protocols such as secure remote attestation and secure boot (e.g., using cryptography engine 190). In some embodiments, the CSM polls individual components/systems of the vehicle for certifications of authenticity or the CSM is provided certifications of authenticity from the various components (e.g., ECUs). The firmware authentication allows the CSM to confirm that requests for compliance with policies sent to the electronic components/systems of the vehicle will be obeyed. In other words, authentic firmware associated with the one or more vehicle components/systems is operable in compliance with the one or more policies.

At 404, the CSM of the vehicle approaching a compliance zone can obtain a policy corresponding to the compliance zone. For example, as described above with respect to operation at 310, the CSM can receive the policy message containing the policy certificate from a policy broadcaster. Additionally or alternatively, the policy can be preloaded in a database in the CSM corresponding to geofenced compliance zones or the vehicle can acquire the policy by requesting the policy (e.g., via V2X, cellular, radio-frequency, any suitable communication mechanism). For example, a regularly updated database, such as an LDM, could either be stored in the vehicle (e.g., inside the secure memory 188 of the CSM 110) or in a memory external to the CSM, but authenticated by the CSM (e.g., via hashing, cryptographic signatures, or the like) to prevent tampering. At 406, and similar to as described with respect to operation at 312, the vehicle and/or CSM optionally receives from a provider of the one or more policies (e.g., from a policy broadcaster), a time-based challenge to prevent a replay attack. The CSM can determine a solution to the time-based challenge and transmit the solution to the time-based challenge when transmitting a certificate of compliance (as described with respect to operation at 414).

At 408, the CSM attempts to authenticate the policy. In some embodiments, after the CSM has received a policy, the CSM cryptographically verifies the authenticity of the policy, using the PKI set up by the central authority. In some embodiments, the CSM authenticates the one or more policies by decrypting a digital signature of the one or more policies using a public key associated with a provider of the one or more policies.

At 410, when the authenticity of the policy verified, the CSM issues compliance instructions to the vehicle components and/or systems. Additionally or alternatively, when the authenticity of the policy verified, the CSM can incorporate the authenticated policy into the LDM for future use. In some embodiments, when the CSM determines that the vehicle is within a compliance zone or its navigation plan indicates an approach to the compliance zone associated with the policy (e.g., within a threshold distance of the compliance zone), the CSM parses the policy, and issues instructions to all electronic components/systems regarding the policy or how to follow the new policy to gain entry to the compliance zone or to remain in compliance while in the compliance zone. The CSM issues compliance instructions to components/systems that are known to be received as valid instructions due to the firmware authentication at operation 404. In some embodiments, the CSM parses the policy for specific settings changes associated with each electronic component/system, confirms that new settings can be applied to components/systems, and provides the settings to components/systems. In some embodiments, the CSM receives a confirmation of receipt of the compliance instructions from the various components/system of the vehicle.

At 412, the CSM can generate a certificate of compliance (or other cryptographically-signed response) when the CSM can confirm that all electronic components/system have not been tampered with (e.g., described with respect to operation at 404) and that the vehicle will comply to the policy in accordance with the compliance instructions issued to the vehicle components/systems (e.g., described with respect to operation at 410).

At 414, the CSM can cause the vehicle to transmit the certificate of compliance and optionally transmit the solution to the time-based challenge (e.g., when a time-limited challenged is used by the policy provider to prevent replay attacks). For example, the CSM 110 transmits the certificate of compliance and/or solution via input/output (I/O) circuitry 192, and the vehicle transmits the certificate of compliance and/or solution via communication circuitry 125. The certificate of compliance is a cryptographically-signed response sent to the policy provider using the communication method indicated by the policy. The solution can also be encrypted (like the certificate of compliance) for increased security and privacy (e.g., using a public key listed in policy broadcast message or using other means such as a cryptographic signature). This compliance certificate message could be sent via V2X or cellular, for example, or another cloud-based interface listed in the policy. In some embodiments, in addition to indicating that the vehicle will comply to the given policy, the compliance certificate message optionally includes additional information such as the vehicle type and a vehicle identification number. As described above with respect to operation at 314-316, the policy provider can receive and verify the certificate of compliance and subsequently grant the vehicle access to the compliance zone.

At 416 or 418, the CSM can issue reset instructions to the vehicle components or systems. In some embodiments, upon leaving the compliance zone or upon termination of the policy by the policy provider, the vehicle receives a "policy-clear" message that the policy is no longer in effect. In some embodiments, the vehicle and/or CSM continuously tracks the vehicle's positions (e.g., using GPS, GLONASS, or the like) and determines when the vehicle has exited the compliance zone (or exited by a threshold distance $D_{TH}$ to avoid terminating the compliance when reentry to the compliance zone is expected or possible shortly thereafter). In some embodiments, a policy includes information regarding the termination conditions of the policy, which might indicate the automatic termination of the policy upon reach the end of the path through the compliance zone or upon leaving the compliance zone/gated premises, or might indicate termination upon receiving a "policy-clear" message. The CSM informs the electronic components/systems of the vehicle that the policy is no longer valid once one or more termination conditions are met.

Process 400 in FIG. 4A primarily addresses verification of a single policy for a compliance zone and the generation of a compliance certificate for the single policy (e.g., upon firmware verification and issuance and implementation of compliance instructions). However, although primarily discussed in the context of one policy, a vehicle may be required to comply with multiple conflicting policies (e.g., for example compliance zone 202-1 and compliance zone 202-2 may have conflicting policies) and/or a vehicle may be unable to completely comply with even the single policy (e.g., disabling radar or imaging sensors may not be feasible for an autonomous vehicle that uses such sensors for safe autonomous driving or flying). FIG. 4B illustrates an example process 401 for managing multiple policies and/or negotiating modifications to a policy for operating a vehicle according to embodiments of the disclosure.

Referring back to process 400, at 408, the CSM verifies a policy. Process 401 can begin, at 403, with checking the newly verified policy for possible incompatibilities. For example, a newly verified policy may be incompatible with other policies that the vehicle is already in compliance with (e.g., past verified policies). Additionally or alternatively, a newly verified policy may be incompatible with safe vehicle operation (or another vehicle operation concern). When the CSM detects an incompatibility at 403, the CSM may propose, at 405, a revised policy representing a resolution of the policy conflicts between two different policies and/or in which some elements of the policy conflicting with safe vehicle operation are not complied with.

In some embodiments, the CSM proposes a resolution that elevates a policy (or policy element) with a relatively higher priority to precedence over a conflicting policy (or policy element). In some embodiments, a policy proactively includes information that indicates to the CSM if the policy can cascade or chain or override or be informational-only to help resolve conflicts. In some embodiments, by default the newly entered compliance zone policy is always considered as highest priority relative to other policies unless the compliance zone policy indicates it can be chained, cascaded or overridden.

The above described revised policy represents a departure from the received policy and/or past verified policies, and therefore the CSM cannot generate and cause transmission of a true certificate of compliance as described in process 400 at 412 and 414. Instead, in some embodiments, the CSM, at 407, generates and causes transmission of an alternative message (encrypted and/or signed by the CSM) to the policy provider. For example, the alternative message includes a certificate of partial compliance, optionally including the proposed revised policy. In a similar manner as described for process 400 with respect to the generation and transmission of a certificate of compliance, the generation and transmission of a certificate of partial compliance may first require firmware authentication (and optionally an indication of provisional issuance of compliance instructions according to the revised policy).

Similar to operation at 318, the certificate of partial compliance may be received by the policy provider, which optionally negotiates access to the compliance zone when only partial compliance is offered or available to the vehicle. The policy provider can decide whether to approve or deny a request from a vehicle for modification of the policy to reflect the revised policy (and thereby use of non-compliant or partially compliant settings with respect to the original policy in the compliance zone). In some embodiments, when the policy provider denies the revised policy, the CSM of the vehicle can repeat operations at 405 and 407 to further negotiate policy compliance. In some embodiments, when the policy provider denies the revised policy, the vehicle is restricted from operating in the compliance zone. When the policy provider approves the revised policy, the CSM receives, at 409, the revised policy or simply an approval of the revised policy. At 411, the CSM verifies the revised policy (or the approval), and in accordance with verifying the authenticity of the message from the policy provider, issues compliance instructions to the vehicle components and system corresponding to the revised policy (or makes permanent the provisional compliance instructions) in a similar manner as described with reference to operation at 410 in process 400. At 413, the CSM can generate and transmit a certificate of compliance (or other cryptographically-signed response) with the revised policy when the CSM can confirm that all electronic components/system have not been tampered with that the vehicle will comply to the revised policy in accordance with the compliance instructions issued to the vehicle components/systems (e.g., in a similar manner as described with reference to operation at 412 and 414).

It is understood that the operations and order of operations described with respect to process 400 and/or process 401 represent example embodiments. It is understood that, in some embodiments, some of the operations can be performed and other operations can be omitted. It is understood that, in some embodiments, some of the operations can be performed in a different order and/or in parallel. The operations of process 400 and/or process 401 are optionally implemented by a compliance enforcement system including a CSM (e.g., as described with respect to CSM 110 of FIGS. 1A-1B) and memory or other non-transitory computer readable storage medium (excluding signals) storing instructions or one or more computer programs to perform the operations of process 400 and/or process 401.

Therefore, according to the above, some examples of the disclosure are directed to a system for operating a vehicle. The system can comprise one or more vehicle systems and compliance enforcement circuitry coupled to the one or more vehicle systems. The compliance enforcement circuitry can be configured to access or otherwise obtain one or more policies associated with respective zones authenticate the one or more policies and in accordance with a determination that the one or more vehicle systems are operating in compliance with the one or more policies, cause transmission of a certificate of compliance indicating that the one or more vehicle systems are operating in compliance with the one or more policies. Additionally or alternatively to one or more of the examples disclosed above, in some examples, the compliance enforcement circuitry can be further configured to authenticate firmware associated with the one or more vehicle systems during operation of the vehicle. Authentic firmware associated with the one or more vehicle systems is operable in compliance with the one or more policies. Additionally or alternatively to one or more of the examples disclosed above, in some examples, the firmware can be authenticated using a cryptographic protocol and/or remote attestation. Additionally or alternatively to one or more of the examples disclosed above, in some examples, the compliance enforcement circuitry can be further configured to poll individual systems of the one or more vehicle systems for certification of the authenticity of their respective firmware. Additionally or alternatively to one or more of the examples disclosed above, in some examples, the compliance enforcement circuitry can be further configured to receive certifications of the authenticity of the firmware associated with the one or more vehicle systems from respective electronic control units (ECUs) of the one or more vehicle systems. Additionally or alternatively to one or more of the examples disclosed above, in some examples, the compliance enforcement circuitry can authenticate the one or more policies by decrypting an/or verifying a digital signature of the one or more policies using a public key associated with a provider of the one or more policies (or using any other suitable authentication method). Additionally or alternatively to one or more of the examples disclosed above, in some examples, the compliance enforcement circuitry can be further configured to: receive, from a provider of the one or more policies, a time-based challenge; determine a solution to the time-based challenge; and in accordance with the determination that the one or more vehicle systems are operating in compliance with the one or more policies, transmit the solution to the time-based challenge along with the certificate of compliance. Additionally or alternatively to one or more of the examples disclosed above, in some examples, the system can further comprise: wireless transceiver circuitry coupled to the compliance enforcement circuitry, the wireless transceiver circuitry configured to receive the one or more policies from a policy provider and/or transmit the certificate of compliance to the policy provider (or another entity). Additionally or alternatively to one or more of the examples disclosed above, in some examples, the compliance enforcement circuitry can be further configured to access a reset policy that reverses changes to the one or more vehicle systems by the one or more policies; authenticate the reset policy; and in accordance with a determination that the vehicle is outside the respective zones, operate the one or more vehicle systems according to the reset policy. Additionally or alternatively to one or more of the examples disclosed above, in some examples, the compliance enforcement circuitry can comprise wireless transceiver circuitry coupled to the compliance enforcement circuitry, the wireless transceiver circuitry configured to receive the reset policy from a policy provider. Additionally or alternatively to one or more of the examples disclosed above, in some examples, the compliance enforcement circuitry comprises memory. The reset policy is optionally stored in the memory from which the compliance enforcement circuitry can access to the reset policy in response to the vehicle exiting the respective zones. Additionally or alternatively to one or more of the examples disclosed above, in some examples, the compliance enforcement circuitry determines a departure from (or a position outside a threshold distance from) a compliance zone and ceases compliance with the one or more policies associated with the compliance zone. Additionally or alternatively to one or more of the examples disclosed above, in some examples, the compliance enforcement circuitry can be further configured to negotiate modifications to the one or more policies with a policy provider based on operating requirements of the vehicle associated with travel through the respective zones. Additionally or alternatively to one or more of the examples disclosed above, in some examples, the system can further comprise memory. The compliance enforcement circuitry can access the one or more policies in the memory prior to the vehicle approaching one of the respective zones; can access a public key associated with a provider of the one or more policies for authenticating the one or more policies; and can access one or more certifications of the authenticity of respective firmware associated with the one or more vehicle systems to be included in the certificate of compliance.

Some examples of the disclosure are directed to a method for operating a vehicle having one or more vehicle systems. The method comprises: accessing or otherwise obtaining, by compliance enforcement circuitry, one or more policies associated with respective zones; authenticating, by the compliance enforcement circuitry, the one or more policies;

and in accordance with a determination that the one or more vehicle systems are operating in compliance with the one or more policies, causing, by the compliance enforcement circuitry, transmission of a certificate of compliance indicating that the one or more vehicle systems are operating in compliance with the one or more policies. Additionally or alternatively to one or more of the examples disclosed above, in some examples, the method further comprises authenticating firmware associated with the one or more vehicle systems at least once during operation of the vehicle. Authentic firmware associated with the one or more vehicle systems is operable in compliance with the one or more policies. Additionally or alternatively to one or more of the examples disclosed above, in some examples, the method further comprises authenticating using a cryptographic protocol and/or remote attestation. Additionally or alternatively to one or more of the examples disclosed above, in some examples, the method further comprises polling (or otherwise obtaining) individual systems of the one or more vehicle systems for certification of the authenticity of their respective firmware. Additionally or alternatively to one or more of the examples disclosed above, in some examples, authenticating the one or more policies comprises decrypting or verifying, by the compliance enforcement circuitry, a digital signature of the one or more policies using a public key associated with a provider of the one or more policies. Additionally or alternatively to one or more of the examples disclosed above, in some examples, the method further comprises accessing, by the compliance enforcement circuitry, a reset policy that reverses changes to the one or more vehicle systems by the one or more policies; authenticating, by the compliance enforcement circuitry, the reset policy; and in accordance with a determination that the vehicle is outside the respective zones, operating the one or more vehicle systems according to the reset policy. Additionally or alternatively to one or more of the examples disclosed above, in some examples, the method further comprises negotiating, by the compliance enforcement circuitry, modifications to the one or more policies with a policy provider based on operating requirements of the vehicle associated with travel through the respective zones.

Some examples of the disclosure are directed to a system for enforcing compliance from a vehicle. The system can comprise a policy transceiver configured to provide the vehicle access to one or more policies associated with respective zones; provide the vehicle authentication information for the one or more policies; determine whether the vehicle is operating in compliance with the one or more policies based on communications received from the vehicle; and in accordance with a determination that the vehicle is operating in compliance with the one or more policies, remove access restrictions to the respective zones from a path of the vehicle. Additionally or alternatively to one or more of the examples disclosed above, in some examples, the policy transceiver is further configured to, in accordance with a determination that the vehicle is not operating in compliance with the one or more policies, maintain access restrictions to the respective zones from the path of the vehicle. Additionally or alternatively to one or more of the examples disclosed above, in some examples, the policy transceiver is further configured to transmit a time-based challenge to the vehicle. The communications received from the vehicle at the policy transceiver can comprise a certificate of compliance and a solution to the time-based challenge.

The invention claimed is:

1. A system for operating a vehicle, comprising:
one or more vehicle systems; and
compliance enforcement circuitry coupled to the one or more vehicle systems, configured to:
access one or more policies associated with respective zones;
authenticate the one or more policies; and
in accordance with a determination that the one or more vehicle systems are operating in compliance with the one or more policies, cause transmission of a certificate of compliance indicating that the one or more vehicle systems are operating in compliance with the one or more policies;
wherein the compliance enforcement circuitry is further configured to:
authenticate firmware associated with the one or more vehicle systems during operation of the vehicle, wherein authentic firmware associated with the one or more vehicle systems is operable in compliance with the one or more policies.

2. The system of claim 1, wherein the compliance enforcement circuitry is further configured to:
poll individual systems of the one or more vehicle systems for certifications of the authenticity of their respective firmware.

3. The system of claim 1, wherein the compliance enforcement circuitry is further configured to:
receive certifications of the authenticity of the firmware associated with the one or more vehicle systems from respective electronic control units (ECUs) of the one or more vehicle systems.

4. The system of claim 1, wherein:
the compliance enforcement circuitry authenticates the one or more policies by decrypting a digital signature of the one or more policies using a public key associated with a provider of the one or more policies.

5. The system of claim 1, wherein:
the compliance enforcement circuitry authenticates the one or more policies by verifying a digital signature of the one or more policies using a public key associated with a provider of the one or more policies.

6. The system of claim 1, wherein the compliance enforcement circuitry is further configured to:
receive, from a provider of the one or more policies, a time-based challenge;
determine a solution to the time-based challenge; and
in accordance with the determination that the one or more vehicle systems are operating in compliance with the one or more policies, transmit the solution to the time-based challenge along with the certificate of compliance.

7. The system of claim 1, further comprising:
wireless transceiver circuitry coupled to the compliance enforcement circuitry, the wireless transceiver circuitry configured to:
receive the one or more policies from a policy provider; and
transmit the certificate of compliance to the policy provider.

8. The system of claim 1, wherein the compliance enforcement circuitry is further configured to:
access a reset policy that reverses changes to the one or more vehicle systems by the one or more policies;
authenticate the reset policy; and in accordance with a determination that the vehicle is outside the respective zones, operate the one or more vehicle systems according to the reset policy.

9. The system of claim 8, wherein the system further comprises:
wireless transceiver circuitry coupled to the compliance enforcement circuitry, the wireless transceiver circuitry configured to receive the reset policy from a policy provider.

10. The system of claim 9, wherein the compliance enforcement circuitry comprises:
memory configured to:
store the reset policy accessible by the compliance enforcement circuitry in response to the vehicle exiting the respective zones.

11. The system of claim 1, wherein the compliance enforcement circuitry is further configured to:
negotiate modifications to the one or more policies with a policy provider based on operating requirements of the vehicle associated with travel through the respective zones.

12. The system of claim 1, further comprising:
memory configured to:
store the one or more policies accessible by the compliance enforcement circuitry prior to the vehicle approaching one of the respective zones;
store a public key associated with a provider of the one or more policies for authenticating the one or more policies, the public key accessible by the compliance enforcement circuitry; and
store one or more certifications of the authenticity of respective firmware associated with the one or more vehicle systems to be included in the certificate of compliance, the one or more certifications of authenticity accessible by the compliance enforcement circuitry.

13. A method for operating a vehicle having one or more vehicle systems, comprising:
accessing, by compliance enforcement circuitry, one or more policies associated with respective zones;
authenticating, by the compliance enforcement circuitry, the one or more policies;
in accordance with a determination that the one or more vehicle systems are operating in compliance with the one or more policies, causing, by the compliance enforcement circuitry, transmission of a certificate of compliance indicating that the one or more vehicle systems are operating in compliance with the one or more policies; and
authenticating firmware associated with the one or more vehicle systems at least once during operation of the vehicle, wherein authentic firmware associated with the one or more vehicle systems is operable in compliance with the one or more policies.

14. The method of claim 13, wherein authenticating the one or more policies comprises:
decrypting, by the compliance enforcement circuitry, a digital signature of the one or more policies using a public key associated with a provider of the one or more policies.

15. The method of claim 13, wherein authenticating the one or more policies comprises:
verifying, by the compliance enforcement circuitry, a digital signature of the one or more policies using a public key associated with a provider of the one or more policies.

16. The method of claim 13, further comprising:

accessing, by the compliance enforcement circuitry, a reset policy that reverses changes to the one or more vehicle systems by the one or more policies;

authenticating, by the compliance enforcement circuitry, the reset policy; and in accordance with a determination that the vehicle is outside the respective zones, operating the one or more vehicle systems according to the reset policy.

17. The method of claim 13, further comprising:

negotiating, by the compliance enforcement circuitry, modifications to the one or more policies with a policy provider based on operating requirements of the vehicle associated with travel through the respective zones.

18. A system for enforcing compliance from a vehicle, comprising:

a policy transceiver configured to:

provide the vehicle access to one or more policies associated with respective zones;

provide the vehicle authentication information for the one or more policies;

determine whether the vehicle is operating in compliance with the one or more policies based on communications received from the vehicle; and in accordance with a determination that the vehicle is operating in compliance with the one or more policies, remove access restrictions to the respective zones from a path of the vehicle; and compliance enforcement circuitry configured to authenticate firmware associated with the one or more vehicle systems during operation of the vehicle, wherein authentic firmware associated with the one or more vehicle systems is operable in compliance with the one or more policies.

19. The system of claim 18, wherein the policy transceiver is further configured to:

in accordance with a determination that the vehicle is not operating in compliance with the one or more policies, maintain access restrictions to the respective zones from the path of the vehicle.

20. The system of claim 18, wherein the policy transceiver is further configured to:

transmit a time-based challenge to the vehicle, wherein the communications received from the vehicle at the policy transceiver comprise:

a certificate of compliance; and a solution to the time-based challenge.

* * * * *